(12) United States Patent
Chuang

(10) Patent No.: US 7,690,082 B2
(45) Date of Patent: Apr. 6, 2010

(54) MULTIDIRECTIONAL SPINDLE CONSTRUCTION

(76) Inventor: Wei-Chieh Chuang, No.8, Lane 195, Fu Ying Road., Hsin Chang City, Taipei Hsien (TW)

( * ) Notice: Subject to any disclaimer, the term of this patent is extended or adjusted under 35 U.S.C. 154(b) by 683 days.

(21) Appl. No.: 11/526,083

(22) Filed: Sep. 25, 2006

(65) Prior Publication Data
US 2007/0154255 A1 Jul. 5, 2007

(30) Foreign Application Priority Data
Oct. 12, 2005 (TW) ............................. 94217587 U

(51) Int. Cl.
E05D 3/10 (2006.01)
(52) U.S. Cl. .......................................... 16/367; 16/342
(58) Field of Classification Search ........... 16/337–339, 16/342, 330, 303, 374, 376, 377, 340; 361/679.06, 361/679.07, 679.11, 679.12, 679.27; 455/90.3, 455/575.1, 575.3, 575.8; 379/433.12, 433.13; 348/373, 333.01, 333.06, 794
See application file for complete search history.

(56) References Cited
U.S. PATENT DOCUMENTS

| | | | | |
|---|---|---|---|---|
| 6,317,927 B1* | 11/2001 | Lai et al. | | 16/342 |
| 6,654,985 B1* | 12/2003 | Lu | | 16/342 |
| 6,850,407 B2* | 2/2005 | Tanimoto et al. | | 361/679.27 |
| 7,346,960 B2* | 3/2008 | Higano et al. | | 16/367 |
| 7,380,313 B2* | 6/2008 | Akiyama et al. | | 16/367 |
| 2003/0221290 A1* | 12/2003 | Lu | | 16/342 |
| 2004/0143936 A1* | 7/2004 | Hsu | | 16/367 |
| 2005/0198779 A1* | 9/2005 | Jung et al. | | 16/367 |
| 2006/0218750 A1* | 10/2006 | Tajima | | 16/367 |
| 2006/0230580 A1* | 10/2006 | Watanabe et al. | | 16/367 |
| 2006/0236504 A1* | 10/2006 | Lu et al. | | 16/342 |

\* cited by examiner

*Primary Examiner*—Chuck Y. Mah
(74) *Attorney, Agent, or Firm*—Guice Patents PLLC

(57) ABSTRACT

The present invention discloses a multi-directional spindle construction, comprising a fixed part which is a seat having a rod hole, at least a sleeve on one side, and an axle hole disposed in the sleeve; at least a horizontal coupler which is a rod provided with an elastic axle fittingly inserted to the axle hole on one side and a linking portion on the other side; a vertical coupler which is also a rod provided with an elastic axle inserted through the rod hole of the fixed part to be secured vertically; and a rotating part which is a tubular body disposed with a sleeve to be insertingly connected to the axle, such that the axle of the horizontal coupler may rotate in the sleeve of the fixed part to achieve lifting open or close and the axle sleeve of the rotating part may freely rotate on the shaft of the vertical coupler.

10 Claims, 5 Drawing Sheets

MULTIDIRECTIONAL SPINDLE CONSTRUCTION

FIELD OF THE INVENTION

The present invention relates to a spindle construction and in particular to a multidirectional spindle construction which has rotating function both in vertical and horizontal directions.

BACKGROUND OF THE INVENTION

Consumer electronics with flip covers, such as portable computer, electronic dictionary, portable audio/video player, flip mobile phone, generally have a main body on the bottom, which is pivotally connected with the cover body on the top, such that the cover body may swing open or close with respect to the main body. Consequently, the rotating shaft is key to the quality of the products described above. In fact, the design for a good rotating shaft shall not only demand a necessary arresting effect to prevent loose joint after repetitive operations, but also prevent abnormal sound from occurring to annoy users.

Through incessant efforts made by companies in the industry, a single spindle unit which can achieve multi-functions has been developed. ROC Patent 573910, for example, discloses a "Hinge Device." The device is used for an electronic device as a hinge between its display panel and main body, in which the display panel may rotate latitudinally within a limited degree through the rotating relationship between the rotating seat and the fixed seat as well as rotate longitudinally within a limited degree through two supports on the rotating seat rotating with respect to the rotating seat, leading to a single hinge providing users with multi-functions. However, from the technical perspective, the rotating seat is two tube with a cut groove disposed on the respective side of a main body, providing the insertion of the inserting end of a connecting leg; the rotating seat can therefore rotate freely. The fixed seat is formed by disposing a limit plate and a long narrow fixed plate above and under a rotating axle, respectively, and then the upper section of the rotating axle being put through the main body and socketingly connected with a plurality of spring plates.

Consequently, the aforementioned invention adopts a radial-friction insertion type spindle in the horizontal direction and an axial-friction in-line type spindle in the vertical direction. In the aspect of cutting down the number of elements and simplifying the assembling process, the volume of the hinge device has to be greatly reduced if it is used in a digital camcorder, as depicted in the drawings of the invention, such that the assembly of the in-line type spindle in the vertical direction will be complicated due to the large number of elements. Thus the production cost will be greatly increased, and an improvement is urgently needed.

SUMMARY OF THE INVENTION

To further improve the aforementioned patent and simplify the number of components for the spindle and its assembly without losing the functions of multidirectional lifting open/close and rotating with arresting and positioning, the applicant having a long time experience in designing, production, and marketing of the spindle proposes the present invention, multidirectional spindle construction, as a result of numerous trials and experiments.

An object of the present invention is to provide a multi-directional spindle construction, comprising a fixed part which is a seat having a rod hole, at least a sleeve on one side, and an axle hole disposed in the sleeve; at least a horizontal coupler which is a rod provided with an elastic axle fittingly inserted to the axle hole on one side and a linking portion on the other side; a vertical coupler which is also a rod provided with an elastic axle inserted through the rod hole of the fixed part to be secured vertically; and a rotating part which is a tubular body disposed with a sleeve to be insertingly connected to the axle, such that the axle of the horizontal coupler may rotate in the sleeve of the fixed part to achieve lifting open or close and the axle sleeve of the rotating part may freely rotate on the shaft of the vertical coupler.

Another object of the present invention is to provide a multi-directional spindle construction, wherein the axle hole and the sleeve hole are stepped portions disposed with a clip-in portion, respectively, to be clipped with the protruding rims of the horizontal coupler and the vertical coupler, and further the exterior of the free end of the protruding rims of the axle and the shaft are fabricated to form a chamfered portion, respectively.

Yet another object of the present invention is to provide a multi-directional spindle construction, wherein the fixed part has two sleeves oppositely arranged with a rod hole fabricated therebetween and the region between the rod hole and its two adjacent sleeves are fabricated to form a seating portion on the top and bottom, respectively, to provide the accommodating and positioning of the vertical coupler and the rotating part.

Still yet another object of the present invention is to provide a multi-directional spindle construction, wherein the axle and the shaft are fabricated to form a milled groove on their perimeters, respectively, and further the axle and the shaft have a rod hole on their centers, respectively, and three equally-spaced milled grooves radially are fabricated around their perimeters so as to form three arc elastic strips, respectively.

Still another object of the present invention is to provide a multi-directional spindle construction, wherein the fixed portion of the vertical coupler is located on the seating portion under the rod hole and at least a milled face is snappingly engaged with the cut face of the seating portion.

Still yet another object of the present invention is to provide a multi-directional spindle construction, wherein the linking portion is a milled-rod, or a polyhedron, which may be fabricated to form at least a board hole, and the connecting portion is a milled-rod, or a polyhedron, which may be fabricated to form at least a board hole.

Still yet another object of the present invention is to provide a multi-directional spindle construction, wherein the axle hole of the vertical coupler is linked through the sleeve hole of the rotating part to facilitate the insertion of cables.

BRIEF DESCRIPTION OF THE DRAWINGS

The present invention can be more fully understood by reference to the following description and accompanying drawings, in which.

DETAILED DESCRIPTION OF THE INVENTION

Figure 1:
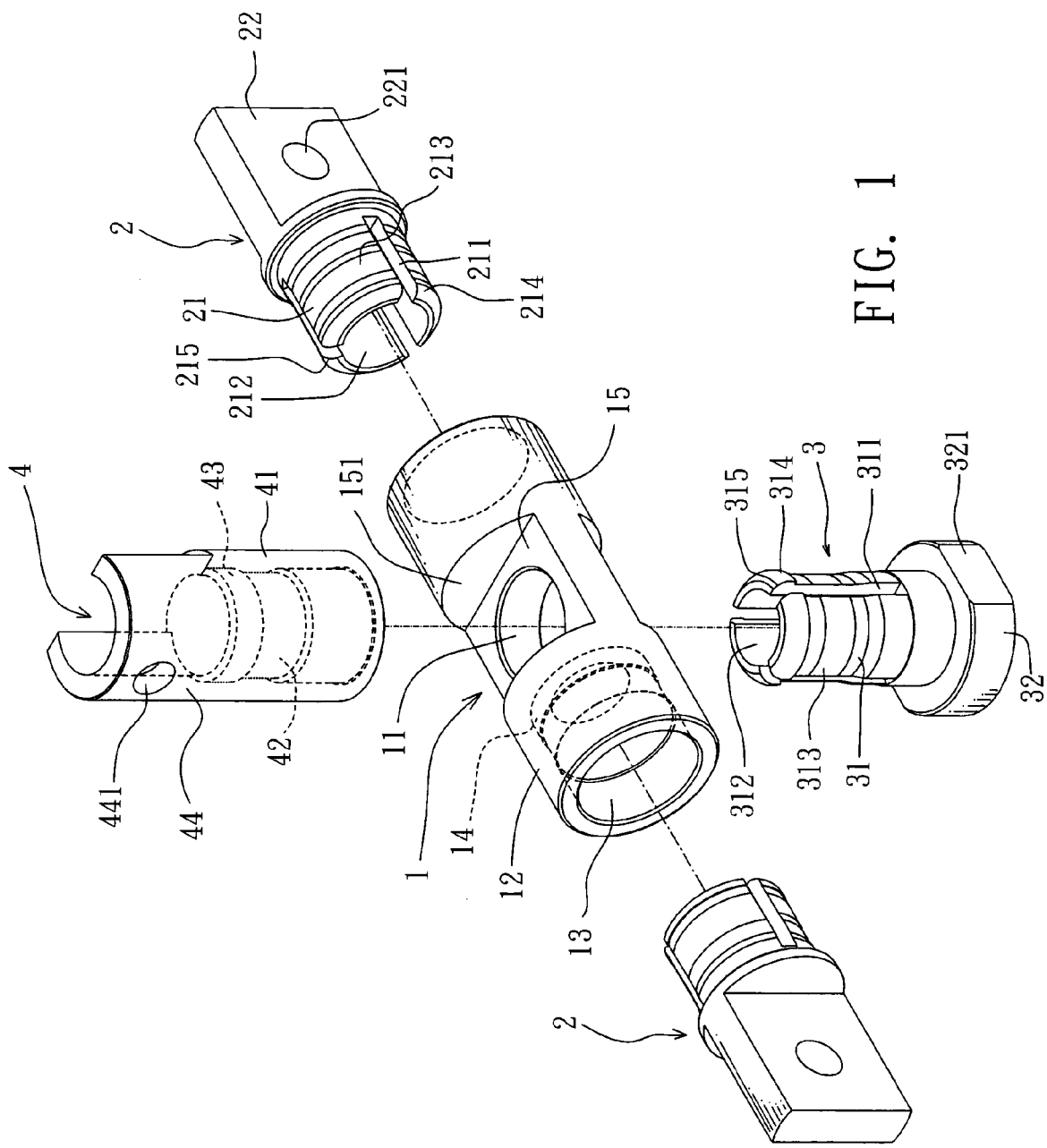
FIG. 1 schematically illustrates the exploded perspective view of the spindle construction according to the present invention.
Figure 2:
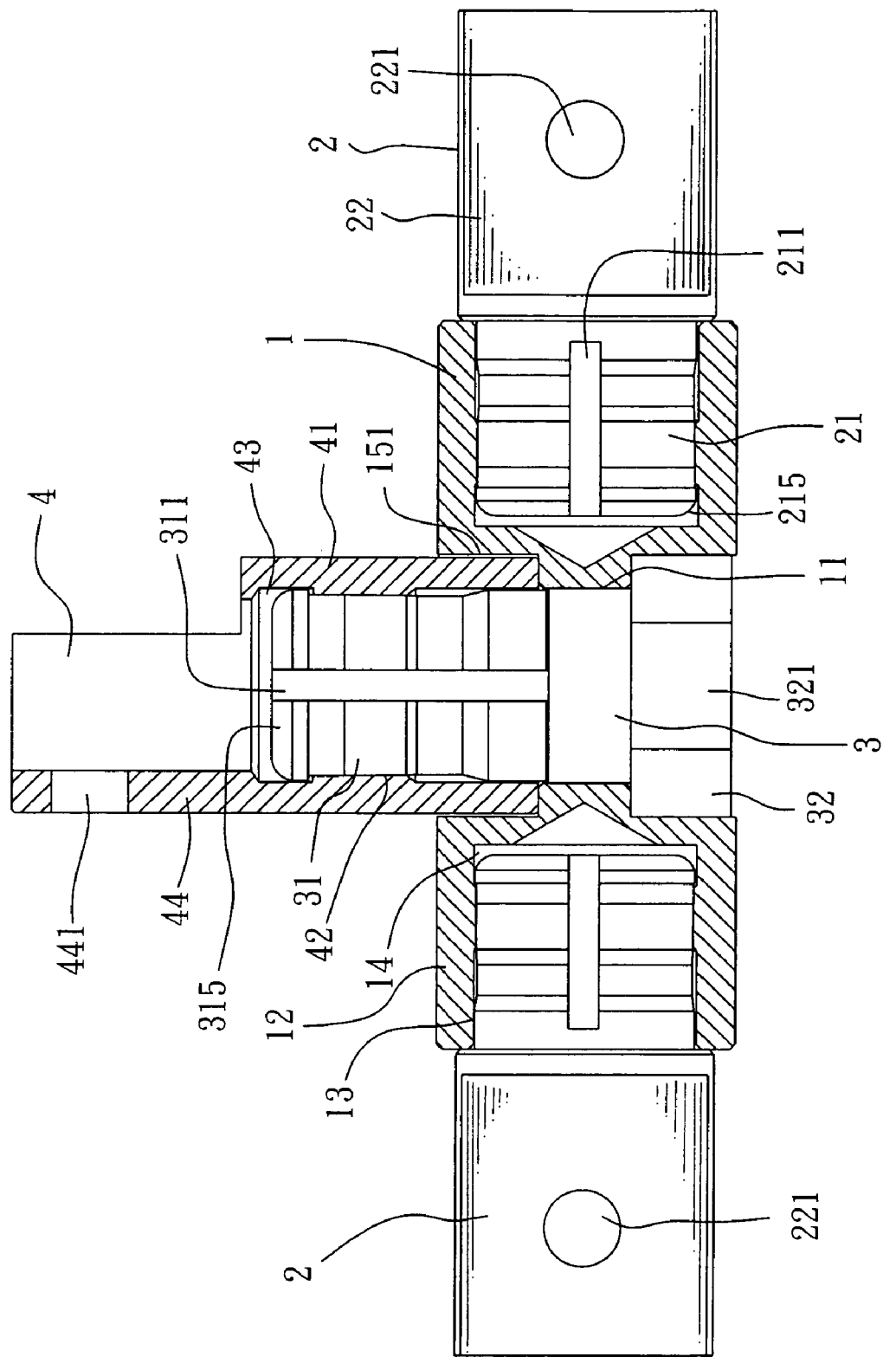
FIG. 2 schematically illustrates the cross-sectional view of the assembled spindle construction according to the present invention.
Figure 3:
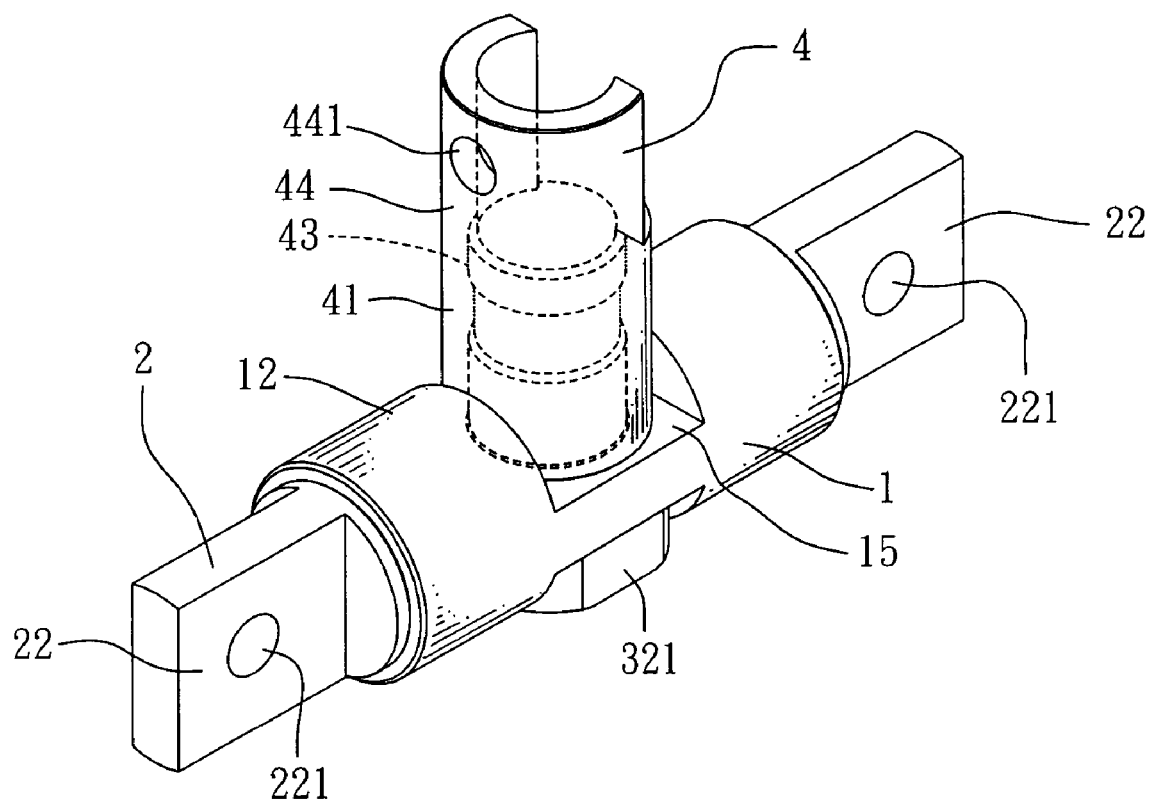
FIG. 3 schematically illustrates the perspective assembly view of the spindle construction according to the present invention.

As depicted in FIGS. 1 to 3, the spindle construction according to the present invention comprises a fixed part 1, at least a horizontal coupler 2, a vertical coupler 3, and a rotating part 4.

The fixed part 1 is a seat having an rod hole 11 fabricated to form on its center for the insertion of the vertical coupler 3 and a sleeve 12 on at least one side, preferably two sides, fabricated to form an axle hole 13, wherein the axle hole 13 is a stepped portion disposed with a clip-in portion 14 to be clipped with the protruding rim 214 of the horizontal coupler 2, such that the horizontal coupler 2 may not come off from the fixed part 1. Also, as depicted in the drawings, the fixed part 1 has two sleeves 12 oppositely arranged with a rod hole 11 fabricated therebetween and the region between the rod hole 11 and its two adjacent sleeves 12 are fabricated to form a seating portion 15 on the top and bottom, respectively, to provide the accommodating and positioning of the vertical coupler 3 and the rotating part 4, of which motions will be disclosed later.

The horizontal coupler 2 is rod comprising an axle 21 and a linking portion 22. The axle 21 is fabricated to form a milled groove 211 on its perimeter to provide some extent of elasticity so as to render its outer diameter slightly larger than the inner diameter of the sleeve 12; consequently, when the axle 21 is inserted into the sleeve 12, the axle 21 may expands radially to form a radial friction (insertion) type spindle. As depicted in the drawings, the axle 21 has a axle hole 212 on its center and three equally-spaced milled grooves 211 radially fabricated around its perimeter so as to form three arc elastic strips 213 on its perimeter to provide the axle 21 some extent f elasticity. Furthermore, the milled grooves 211 and the rod hole 212 may receive lubricating grease to achieve lubrication.

Furthermore, to prevent the inserting connection between the fixed part 1 and the horizontal coupler 2 from coming off, the axle 21 is disposed with a protruding rim 214 near its free end. To facilitate the insertion of the axle 21 into the sleeve 12, the exterior of the free end of the protruding rim 214 is fabricated to form a chamfered portion 215.

The linking portion 22 is to be connected with an object, a main body for example. As depicted in the drawings, a plate hole 221 is for the insertion of a conventional connecting part, a screw for example, which is then mounted onto an object. However, the connection of the linking portion 22 and an object is not limited to the aforementioned means. Other inserting connection means may also be possible. For example, the linking portion 22 is a milled-rod, a triangular prism, quadrant prism, and other polyhedron, for fittingly inserting and locating the object, which are also within the scope of the present invention.

The vertical coupler 3 is also a rod comprising a shaft 31 and a fixed portion 32. The shaft 31 is inserted through and securingly mounted in the rod hole 11 of the fixed part 1 in a vertical position to be fittingly inserted with the rotating part 4 described later. Since the shaft 31 is in general the same with the aforementioned axle 21, their corresponding elements are named similarly with different identification number. That is, the shaft 31 has an axle hole 312 on its center and three equally-spaced milled grooves 311 radially fabricated around its perimeter so as to form three arc elastic strips 313 on its perimeter to provide the shaft 31 some extent f elasticity. Furthermore, the milled grooves 311 and the axle hole 312 may receive lubricating grease to achieve lubrication.

The vertical coupler 3 according to the present invention is characterized by that the fixed portion 32 is located on the seating portion 15 under the rod hole 11. For example, at least a milled face 321 is snappingly engaged with the cut face 151 of the seating portion 15. However, the fastening means is not limited to the aforementioned means. Clipping or screwing may also be used to mount the vertical coupler 3 onto the fixed part 1 vertically to prevent the vertical coupler 3 from rotating.

The rotating part 4 is a tubular body disposed above the rod hole 11 having an axle sleeve 41 which has the same functions as the sleeve 12, and thus their corresponding elements are named similarly with different identification number. That is, the sleeve hole 42 on one end of the axle sleeve 41 is a stepped portion disposed with a clip-in portion 43 to be clipped with the protruding rim 314 of the vertical coupler 3, such that the vertical coupler 3 may not come off from the fixed part 1. A connecting portion 44 is disposed on the other end of the rotating part 4 to be mounted onto another object, a cover body for example, such that the rotating part 4 may rotate freely on the vertical coupler 3.

As depicted in the drawings, the connecting portion 44 may be, for example but not limited to, a milled-rod, a triangular prism, quadrant prism, or other polyhedron, for fittingly inserting to and positioning on the object. A connecting hole 441 is fabricated on the connecting portion 44 for the insertion of a conventional connecting part, a screw for example, which is then mounted onto another object.

Furthermore, the axle hole 312 of the vertical coupler 3 is linked through the sleeve hole 42 of the rotating part 4 to facilitate the insertion of cables, such that when the rotating part 4 is rotating, the cables may not be entangled.

With further reference to FIGS. 1 to 3, during the assembly process, the oppositely arranged horizontal couplers 2 are aligned with the axle hole 13 of the two sleeves 12 of the fixed part 1 and then fittingly inserted in traditional close fit, such that the protruding rim 214 on the free end is clipped with the clip-in portion 14 in the axle hole 13 to form a spindle construction with the function of arresting and positioning horizontally. Furthermore, the shaft 31 of the vertical coupler 3 is put through the rod hole 11 and then fittingly inserted into the sleeve hole 41 of the rotating part 4 in a traditional close fit, such that the protruding rim 314 on the free end is clipped with the clip-in portion 43 in the sleeve hole 42 to form a spindle construction with the function of arresting and positioning vertically. The assembly process is then completed. Finally, the linking portion 22 of the horizontal coupler 2 is mounted onto to an object, a main body for example, and the connecting portion 44 of the rotating part 4 is mounted onto another object, a cover body for example, such that the spindle construction according to the present invention may be assembled in the main body and cover body of an electronic device.

Figure 4:
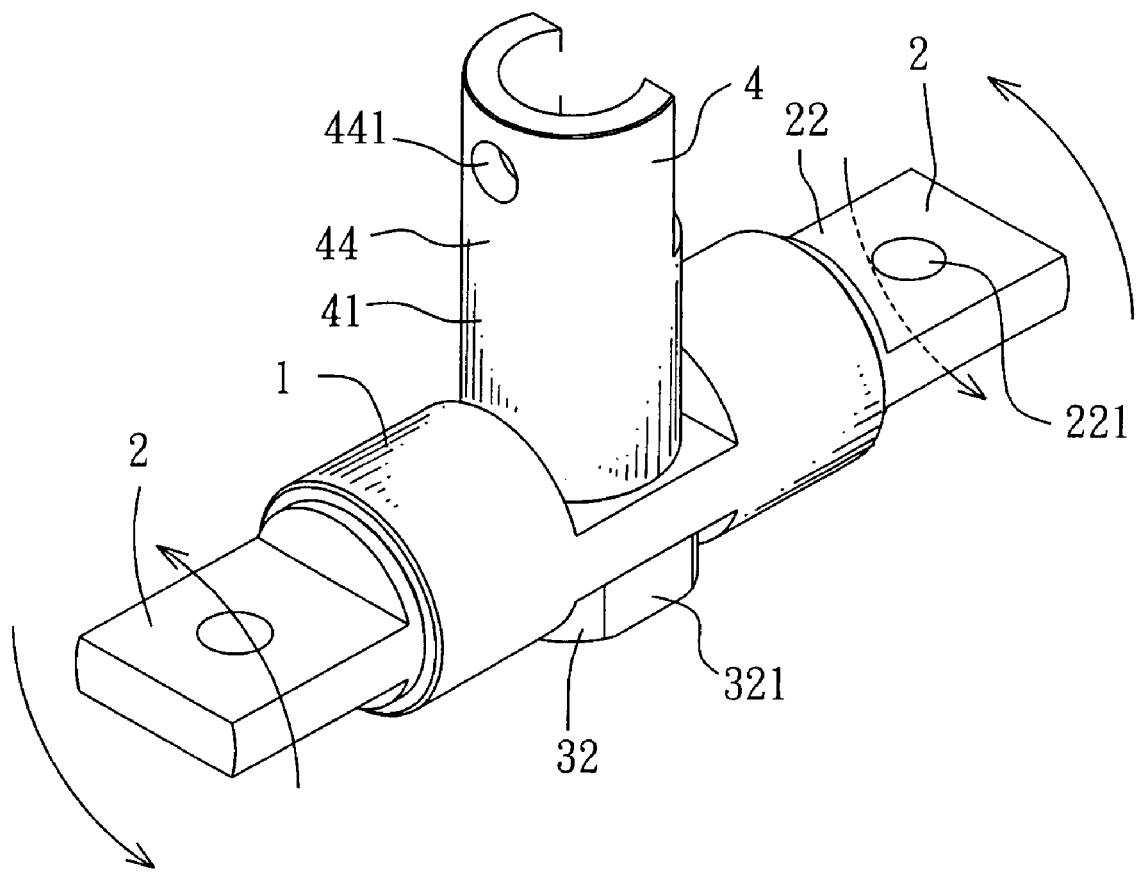
FIG. 4 schematically illustrates the perspective view of the spindle construction in an open condition according to the present invention.
Figure 5:
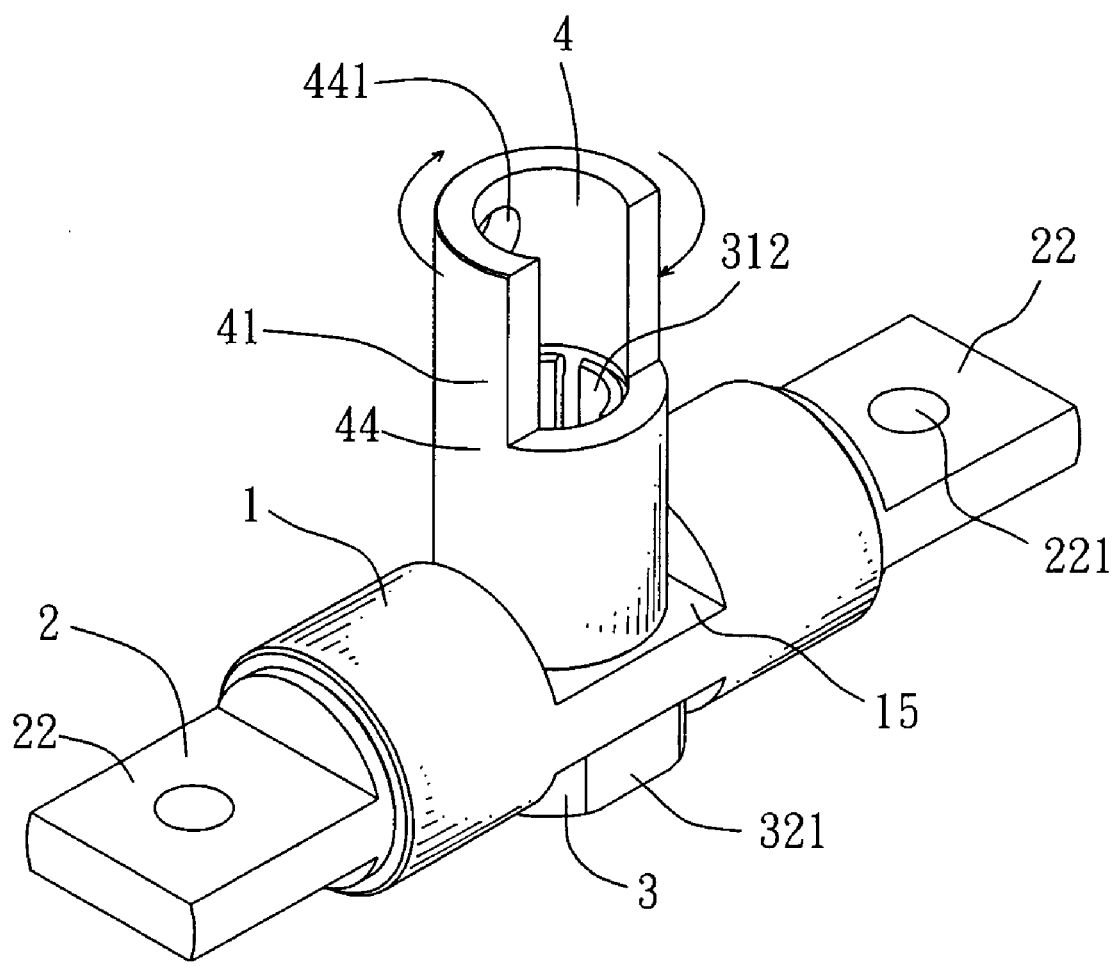
FIG. 5 schematically illustrates the exploded perspective view of the spindle construction in a close condition according to the present invention.

When the multidirectional spindle construction according to the present invention being operated, with reference to FIG. 4, the two horizontal coupler 2 are connected with the main body, the sleeves 12 on respective side of the fixed part 1 and the axle 21 of the two horizontal coupler 2 may achieve the motion of lifting open or close due to the frictional force generated therebetween. With reference to FIG. 5, when the rotating part 4 is under externally applied force, the rotating part 4 may rotates freely on the shaft 31 of the vertical coupler 3.

Consequently, when the spindle construction according to the present invention being implemented, it possess not only the basic lifting open/close function horizontally, but also the free rotation in the vertical direction. Also, the present invention is an insertion type construction, leading to a much reduced volume; thus it is very suitable to be used in the "light, thin, short, small" electronic products, mobile phone, digital camera, digital camcorder, and so on, for example. Furthermore, the vertical coupler and the rotating part can be inserted through by cables, such that when the rotation part is rotating, cables will not be entangled. Also, the present invention has reduced the number of elements in a spindle construction and simplified its assembly, leading to a saving in labor hour and thus a low production cost.

While the invention has been described with reference to the a preferred embodiment thereof, it is to be understood that modifications or variations may be easily made without departing from the spirit of this invention, which is defined by the appended claims.

What is claimed is:

1. A multi-directional spindle construction comprising:
   a fixed part having a rod hole, at least one sleeve on one end thereof, and an axle hole located in the at least one sleeve;
   at least one horizontal coupler having an elastic axle located on a first end and a linking portion located on a second end thereof, the elastic axle is fittingly inserted to the axle hole;
   a vertical coupler having an elastic shaft inserted through the rod hole of the fixed part to be secured vertically; and
   a rotating part being a tubular body and having an axle sleeve having a sleeve hole, the axle sleeve is connected to the vertical coupler by inserting the shaft into the sleeve hole,
   such that the axle of the at least one horizontal coupler is rotatable in the sleeve of the fixed part to achieve lifting open or close and the axle sleeve of the rotating part is rotatable on the shaft of the vertical coupler.

2. The device as defined in claim 1, wherein the axle hole has a stepped portion including a clip-in portion, the at least one horizontal coupler has a protruding rim inserted into the clip-in portion of the axle hole, the sleeve hole has a stepped portion including a clip-in portion, the vertical coupler has a protruding rim inserted into the clip-in portion of the sleeve hole.

3. The device as defined in claim 1, wherein the at least one sleeve of the fixed part is two sleeves located on opposing ends of the fixed part and having the rod hole located therebetween, a region surrounding the rod hole and located between the two sleeves is a seating portion located on a top and a bottom of the fixed part to provide the accommodating and positioning of the vertical coupler and the rotating part.

4. The device as defined in claim 1, wherein each of the axle of the at least one horizontal coupler and the shaft of the vertical coupler has a milled groove on a perimeter thereof, respectively.

5. The device as defined in claim 1, wherein each of the axle of the at least one horizontal coupler and the shaft of the vertical coupler has a rod hole located in a center thereof, respectively, and three equally-spaced milled grooves extending axially through a perimeter wall thereof and forming three arc elastic strips, respectively.

6. The device as defined in claim 1, wherein the linking portion of the at least one horizontal coupler is one of a milled-rod and a polyhedron and has at least one plate hole, and the rotating part has the axle sleeve located on a first end thereof and a connecting portion located on a second end thereof, the connecting portion is one of a milled-rod and a polyhedron and has at least one connecting hole.

7. The device as defined in claim 1, wherein each of the axle of the at least one horizontal coupler and the shaft of the vertical coupler has a free end having a chamfered portion, respectively.

8. The device as defined in claim 1, wherein the vertical coupler has a fixed portion connected to the shaft, the fixed portion has at least one milled face, the fixed part has a seating portion having a cut face, the at least one milled face of the fixed portion engaging the cut face of the seating portion.

9. The device as defined in claim 8, wherein the rotating part has the axle sleeve located on a first end thereof and a connecting portion located on a second end thereof, the connecting portion is one of a milled-rod and a polyhedron and has at least one connecting hole.

10. The device as defined in claim 1, wherein the vertical coupler has a vertical coupler axle hole communicating with the sleeve hole of the rotating part.

* * * * *